US006738448B1

United States Patent
Okamoto

(10) Patent No.: US 6,738,448 B1
(45) Date of Patent: May 18, 2004

(54) TRANSMITTER AND RECEIVER FOR MULTI-RATED DELAY MULTIPLEXING DIRECT SPREAD SPECTRUM COMMUNICATION SYSTEM, AND MULTI-RATED DELAY MULTIPLEXING DIRECT SPREAD SPECTRUM COMMUNICATION SYSTEM

(75) Inventor: Naoki Okamoto, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/509,486

(22) PCT Filed: Oct. 16, 1998

(86) PCT No.: PCT/JP98/04704

§ 371 (c)(1),
(2), (4) Date: Mar. 29, 2000

(87) PCT Pub. No.: WO99/23777

PCT Pub. Date: May 14, 1999

(30) Foreign Application Priority Data

Nov. 4, 1997 (JP) ............................................. 9-302182

(51) Int. Cl.$^7$ .............................................. H04B 7/216
(52) U.S. Cl. ........................ 376/335; 370/342; 375/146
(58) Field of Search ................................ 370/335, 742, 370/320; 375/146, 147, 130, 377

(56) References Cited

U.S. PATENT DOCUMENTS

| | | | | |
|---|---|---|---|---|
| 5,291,515 A | * | 3/1994 | Uchida et al. | 375/142 |
| 5,400,359 A | * | 3/1995 | Hikoso et al. | 375/133 |
| 5,559,828 A | * | 9/1996 | Armstrong et al. | 375/130 |
| 5,602,833 A | * | 2/1997 | Zehavi | 370/209 |
| 6,175,558 B1 | * | 1/2001 | Miya | 370/335 |

FOREIGN PATENT DOCUMENTS

| | | |
|---|---|---|
| JP | A5-130068 | 5/1993 |
| JP | A5-183534 | 7/1993 |
| JP | A8-335928 | 12/1996 |
| JP | A9-023170 | 1/1997 |
| JP | A9-055714 | 2/1997 |
| JP | A9-289501 | 11/1997 |
| JP | A10-093531 | 4/1998 |
| JP | A10-112697 | 4/1998 |
| JP | A10-164014 | 6/1998 |

\* cited by examiner

*Primary Examiner*—Min Jung
*Assistant Examiner*—Andy Lee
(74) *Attorney, Agent, or Firm*—Birch, Stewart, Kolasch & Birch, LLP

(57) ABSTRACT

A multi-rated delay multiplexing direct spread spectrum communication system the multiplicity of which can be changed. The system performs control operation as quickly as possible by suppressing the output fluctuation within a narrow range so as to perform constant power transmission. A gain-variable amplifier is provided at the succeeding stage of a modulator and the gain of the amplifier is controlled by a control signal generated based on the detection signal of the output of a power amplifying section. A detecting and control section detects the RF output of a delay multiplexing spread signal by a diode, finds the average power by an integrator, and equalizes the output of the amplifier to a comparation voltage by a control signal which is generated on comparing the average power with the comparation voltage. However, when the output of the amplifier is equalized to the comparation voltage, the time constant of the integration performed by the section is kept small for a fixed period of time by using a control signal representing a simplex/multiplex part. Consequently, a multiplexing switching section can quickly control the power.

13 Claims, 16 Drawing Sheets

000# TRANSMITTER AND RECEIVER FOR MULTI-RATED DELAY MULTIPLEXING DIRECT SPREAD SPECTRUM COMMUNICATION SYSTEM, AND MULTI-RATED DELAY MULTIPLEXING DIRECT SPREAD SPECTRUM COMMUNICATION SYSTEM

CROSS REFERENCE TO RELATED APPLICATIONS

This application is the national phase under 35 U.S.C. §371 of PCT International Application No. PCT/JP98/04704 which has an International filing date of Oct. 16, 1998, which designated the United States of America, and is based on Patent Application No(s). JP 9-302182 filed in Japan on Nov. 4, 1997, the entire contents of which are hereby incorporated by reference.

BACKGROUND OF THE INVENTION

1. Field of the Invention

The present invention relates to a spectrum spread communication and in particular to a (multi-rated) multiplexing direct spread spectrum communication having a variable multiplicity in which the transmission power is made constant.

2. Description of the Relates Art

Recently spread spectrum communication systems have attracted attention as new communication systems. The modulation schemes used for general data transmission are narrow band modulation scheme. Although they can be implemented by a relatively small circuit, they have a disadvantage that they are susceptible to multipath phasing and colored noise in a narrow band indoors (offices, factories).

In contrast to this, the spread spectrum communication systems are advantageous in that the above-mentioned disadvantage is overcome since the spectrum of data is spread with a spreading code for transmission in a broad band.

However, high rate data transmission is hard to conduct since the wider band is required for the higher data transmission rate. For example, if data transmission using QPSK (Quadrature Phase Shift Keying) scheme by spreading data with a 11 chips is contemplated, 22 MHz band is required for 2 Mbps data transmission. 110 MHz band is required for data transmission at a rate of 10 Mbps.

Further, regulation of bands in which radio wave transmission is permitted also makes it harder to conduct high rate data transmission.

Accordingly, in order to conduct high rate transmission in a restricted band, a multiplexing scheme in which spread signals are delayed (hereinafter referred to as "delay multiplexing scheme) is proposed (refer to Japanese Laid-Open Patent Publication No. 9-55714).

Use of this scheme makes it possible to conduct high rate transmission in a restricted band. If the scheme which is disclosed in the cited publication No. 9-55714 is used for the former example (2 Mbps data, 22 MHz band), duplexing and quintuplexing in the same band enables data transmission at 4 and 10 Mbps, respectively.

FIG. 1 is a block diagram showing an exemplary circuit used for heretofore proposed delay multiplexing scheme.

In FIG. 1, data which is generated by a data generating portion 110 is differentially coded by a differential encoding portion 111 and then parallel-converted into numbers to be multiplexed by an S/P converting portion 112.

Subsequently, the parallel data is spread by being multiplied by a PN code from a PN generator 114 by respective multiplying portions (113-1 through 113-4) and then delayed by respective delay elements (115-1 through 115-4).

Then, the delayed data are combined into multivalued digital signals by a combiner (frequency combining device) 116. The digital signals are modulated by an oscillated signal from an oscillator 120 in a modulator 119. The signal is transmitted via a frequency converting portion 122 and power amplifier 123.

As a result, high rate data transmission in a limited band is made possible.

In a telecommunications system using such a spectrum spreading, the transmission signal assumes +1 or −1, and the multiplexed signal assumes multivalue in the multiplex part. For example, the quintuplexed signal assumes values of −5, −3, −1, 1, 3, 5.

This is shown in FIG. 2. As shown in FIG. 2, the multiplexed operation values differ largely in simplex and multiplex parts.

On the other hand, in the communication system, the signal, the frequency of which is converted to a radio frequency range is usually transmitted. In this case, the operation value assumes 1 and −1 in the simplex part and −5, −3, −1, 1, 3, 5 in the quintuplex part, so that the transmission outputs are not identical in the simplex and multiplex parts.

For the spread spectrum communications in Japan, the communication system using ISM (Industrial, Scientific and Medical) band is permitted as special low power communication system in an assigned band in Japan. A standard RCR-STD-33 (RCR: Research and Development Center for Radio System) is established.

In this standard, usable bands, physical specifications such as allowed power are determined. As to transmission power, it is regulated that the filed transmission power should be kept except for several tolerances.

Accordingly, there is the risk of transmission of the power exceeding the standards if the signal as multiplexed is amplified with the same amplification and is output.

It is also preferable for a high power amplifier in a transmitter system and for an amplifier in a receiver that the power is equal in the simplex/multiplex parts. Use of the system which can not satisfy these requirements provides problems.

The other circuit systems in the communication system in interest are shown in FIGS. 3 and 4.

The differences between the circuits of FIGS. 1 and 3 reside in the difference in the multiplication and in that detection and control portion 121c and gain-variable amplifier 121 are additionally provided in the latter circuit.

FIG. 4 shows a variation of the configuration of FIG. 3 for conducting the spreading, delaying and adding operations in a digital manner and is substantially identical with the configuration of FIG. 3 except that the signal is delay-multiplexed by means of multipliers 113'-1 through 113'-5, delay elements 115'-1 through 115'-5 and operating portions 117, and is thereafter D/A converted by a D/A convertor 118 and is input to a modulator 119.

As shown in FIGS. 3 and 4, some communication systems have a gain-variable amplifier 121, the gain of which is changed in response to a signal from the detection and control portion 121c which detects the power of the transmission system for controlling the transmission output to a constant output.

The gain-variable amplifier 121 is disposed at the succeeding stage of the modulator 119 for reducing or eliminating variations of elements in the system such as lowering of output which may be caused by variations in characteristics such as temperature characteristics among the elements and aging of elements.

The detection and control portion 121c usually determines the power of RF or IF signal after the modulator 119 as a signal to be controlled for controlling the gain-variable amplifier 121 to keep the power of the signal after detection in response to determined power.

Since the control operation inherently contemplates to absorb the variations among systems, the time constant of integration is set comparatively longer so that the characteristics will not be varied due to noise. The characteristics when a signal having the simplex/multiplex part is input to this circuit is shown in FIG. 5.

FIG. 5(A) shows the changes in the output power on the input side of the gain-variable amplifier 121. FIG. 5(C) shows the output when the gain is variably changed. FIG. 5(B) shows the control voltage when the above-mentioned time constant of integration is set comparatively longer.

As shown in FIG. 5(C), there is a problem that in the transient period, the transmission power will largely increase by the amount corresponding to the integration interval at the transient although the transmission power is kept constant after the lapse of the considerable period of time.

SUMMARY OF THE INVENTION

It is an object of the present invention to provide a direct spread spectrum communication system using a multi-rated delay multiplexing scheme, the multiplicity of which is changed, the system performing control operation as quickly as possible by suppressing the output fluctuation within a narrow range so as to perform constant power transmission.

In accordance with the present invention, there is provided a transmitter for a multi-rated delay multiplexing direct spread spectrum communication system including delay multiplexing means for multiplexing a plurality of series of signals which are obtained by delaying, by a desired number of chips, each of the signals. The signals are directly spread with the same spreading code. Transmission processing means is included for generating transmission signals by modulating the signals which have been multiplexed by the delay multiplexing means and by changing the frequency band of them, in which multi-rated transmission signals are generated in a format having a simplex part and a multiplex part having a given multiplicity. There is also provided control means for controlling the transmission power so that it is constant, and in which the control means performs a control operation depending upon the multiplicity of the format.

In accordance with the present invention, said control means changes its control operation in response to a multiplicity representing signal which is determined by said format when the multiplexing operation is switched in response to the multiplicity representing signal for making the transmission power constant for each multiplicity.

In accordance with the present invention, the transmitter comprises: detecting means for detecting the output transmission power in said transmission processing means; and means for controlling the amplified output of said transmission processing means in response to the detection output of said detecting means; and in that the time constant of the integration of said detecting means is reduced in response to a multiplexing switching signal which is defined by said format at the transient at which multiplexing is switched.

In accordance with the present invention, the transmitter comprises: detecting means for detecting the output transmission power in said transmission processing means; and means for controlling the amplified output of said transmission processing means in response to the detection output of said detecting means; and the time constant of the integration of said detecting means is reduced in response to a signal representing a simplex part in said format and a multiplexing switching signal which is defined by said format at the transient at which multiplexing is switched.

In accordance with the present invention, the transmitter comprises: detecting means for detecting the output transmission power in said transmission processing means; control means for controlling the amplified output of said transmission processing means in response to the detection output of said detecting means; and means for converting the amplitude of the control signal from said controlling means in response to a multiplexing signal which is defined by the format.

In accordance with the present invention, if a digital operation is performed in the delay multiplexing means as one of the control means, changing of a multiplier for the data to be multiplexed in the digital operation depends upon a signal representative of the multiplicity. The signal is determined by the format, so that the average amplitude is constant in a square root among multiplicity including simplex.

In accordance with the present invention, if a digital operation is performed in said delay multiplexing means, a numerical value table which is referenced by the multiplexing data of the result of said digital operation is used as one of said control means; and data is output which makes the transmission power constant by changing said numerical value table in response to a signal representative of the multiplicity which is determined by said format.

In accordance with the present invention, for each multiplicity, there are the numerical value tables having numerical values which make the converted transmission power constant even if the numerical values which are given to a D/A convertor for D/A data conversion after referencing to one of the numerical value tables are discrete values, and the numerical value table is selected depending upon a signal representative of the multiplicity which is determined by the format.

In accordance with the present invention, if the Barker code of 11 chips is multiplexed and a 8 bit D/A convertor is used, the numerical value which is provided in each of said numerical value tables is −38, 38 when simplexing −54, 0, 54 when duplexing −66, −22, 22, 66 when triplexing −76, −38, 0, 38, 76 when quadruplexing −85, −51, −17, 17, 51, 85 for quintuplexing.

In accordance with the present invention, there is provided a receiver for multi-rated delay multiplexing direct spread spectrum communication system having receiving and processing means for receiving signals. The signals are transmitted at a equal transmission output irrespective of the multiplicity, by multi-rating the signals which are a spreading-code-spreaded, in a format having a multiplex part. A plurality of series of signals are each delayed by a desired number of chips and a simplex part. Also, the gain adjustment in the receiving and processing means, on reception, is conducted depending upon a correlation output value. A reference comparison value is compared with the correlation output value for generating a control signal of the gain adjustment which is preset to a comparison value depending upon a power ratio of the multiplicity by a multiplexing switching portion based upon the format.

In accordance with the present invention, there is provided a receiver for multi-rated delay multiplexing direct spread spectrum communication system having receiving and processing means for receiving signals. The signals are transmitted at a equal transmission output irrespective of the multiplicity, by multi-rating the signals which are a spreading-code-spreaded, in a format having a multiplex part. A plurality of series of signals are each delayed by a desired number of chips. The gain adjustment in the receiving and processing means on reception is conducted depending upon a correlation output value. The correlation output value is compared with a reference comparison value and used for generating a control signal for gain adjustment. A correlation output value, which is obtained by converting a correlation signal received from a multiplexing switching portion based upon the format, depends upon the power ratio of its multiplicity.

In accordance with the present invention, there is provided a multi-rated delay multiplexing direct spread spectrum communication system comprising: the inventive transmitter; and the inventive receiver.

DESCRIPTION OF THE INVENTION

Figure 6:
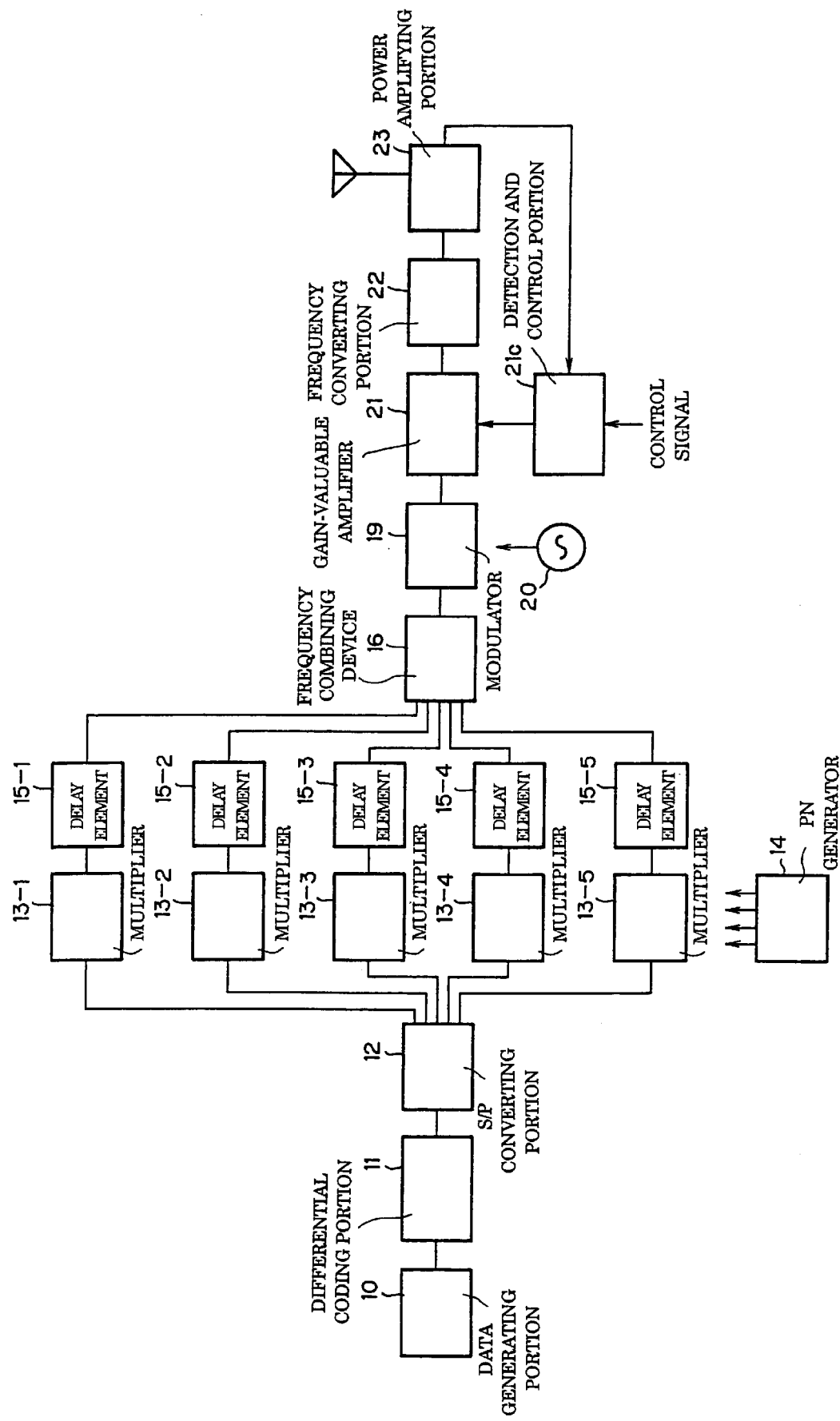
FIG. 6 is a circuit block diagram showing an embodiment of a transmitter for the multi-rated delay multiplexing direct spread spectrum communication system of the present invention.

A transmitter for the multi-rated delay multiplexing direct spread spectrum communication system which is a first embodiment of the present invention is shown in FIG. 6.

Figure 1:
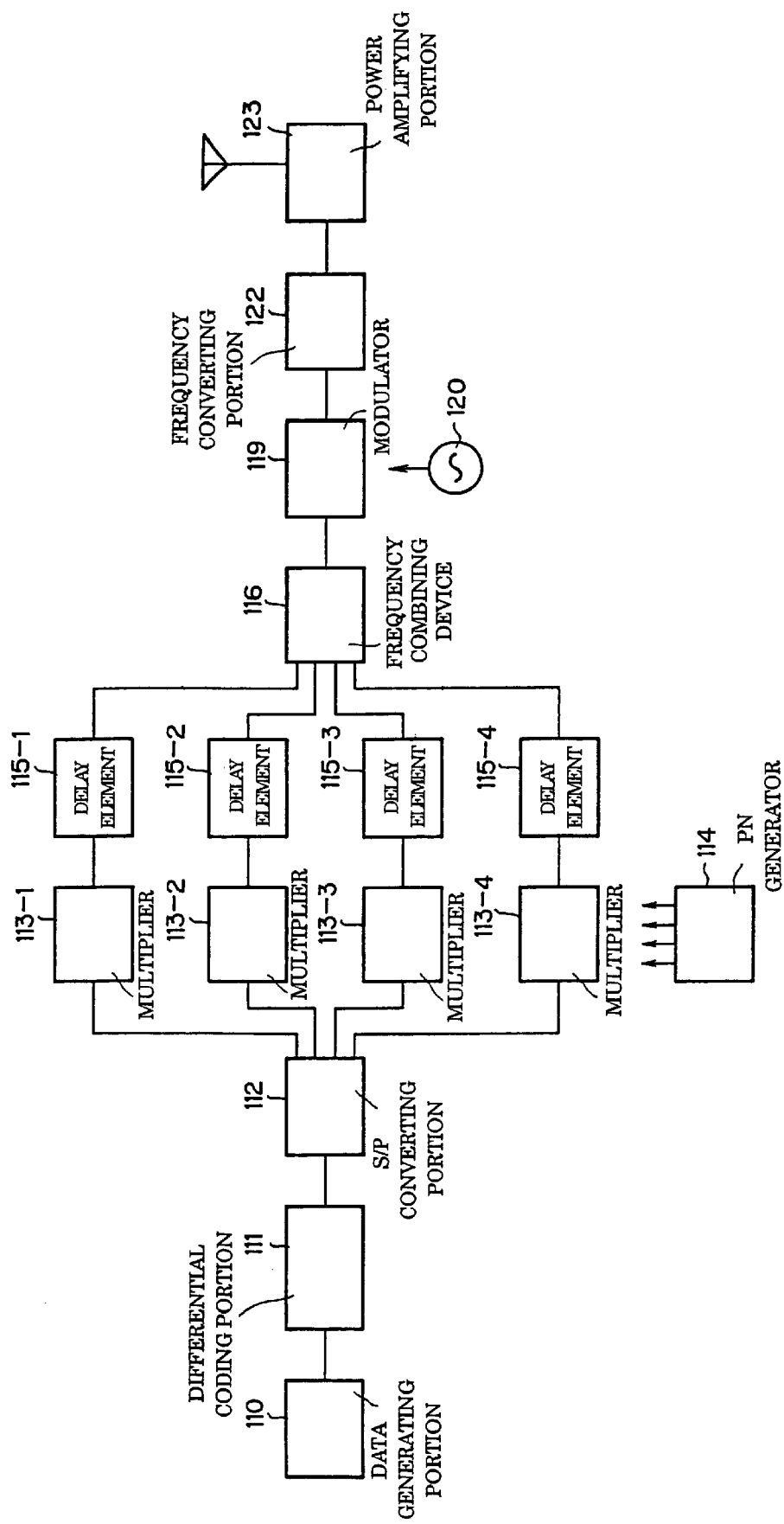
FIG. 1 is a circuit block diagram of on the side of a transmitter showing a direct spread spectrum communication system using a delay multiplexing scheme.
Figure 2:
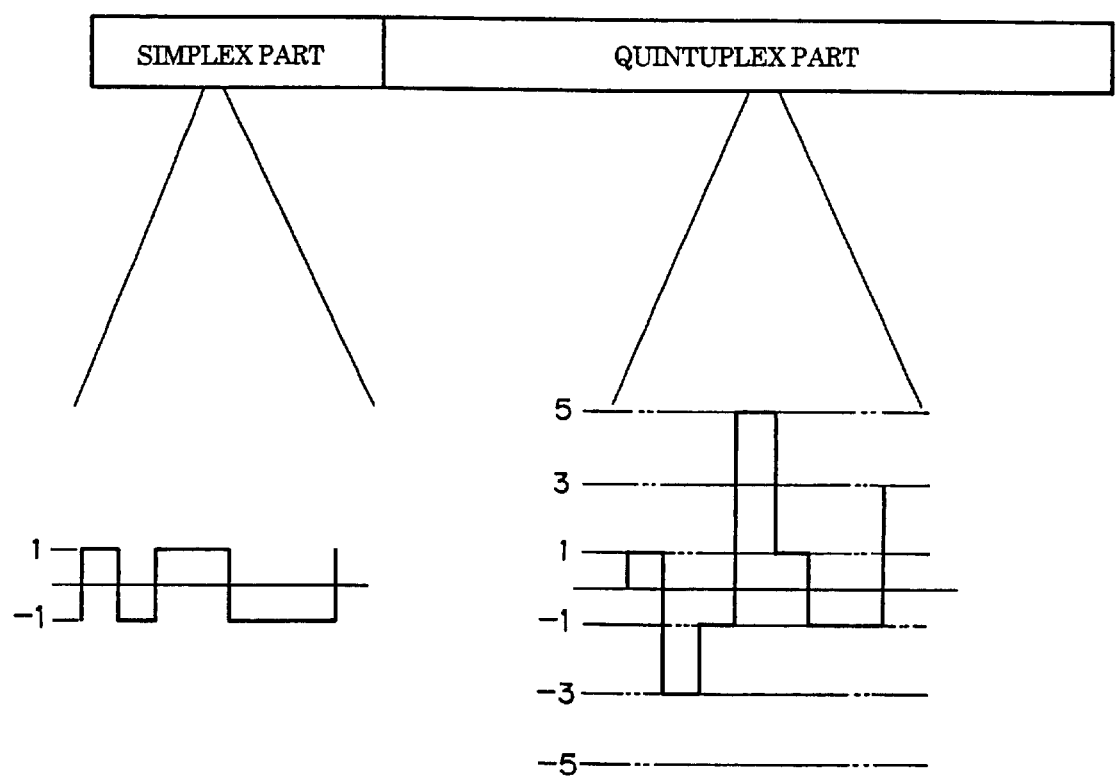
FIG. 2 is a diagram showing operation values of the amplitude of the each multiplexed signals when they are simplexed or quintuplexed.
Figure 3:
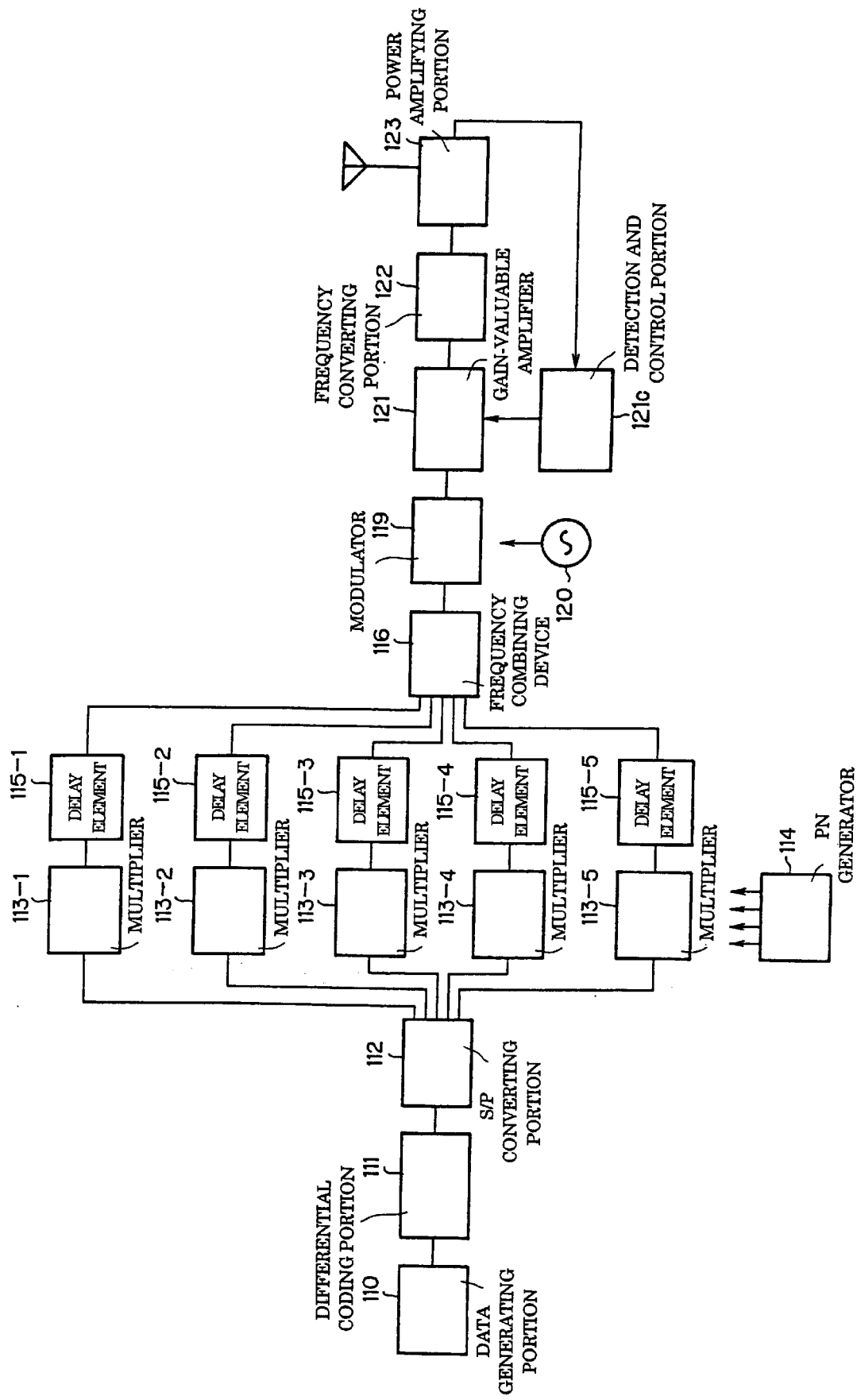
FIG. 3 is a circuit block diagram of on the side of a transmitter showing another direct spread spectrum communication system using a delay multiplexing scheme.

The transmitter illustrated in the drawing corresponds to the prior art shown in FIG. 3. A gain-variable amplifier 21 which is disposed at the succeeding stage of the modulator 19 is controlled in response to a control signal which is generated based upon a detection signal which is generated by detecting the output of a power amplifier 23.

This control is conducted in the detection and control portion 21c. Detection is usually conducted by means of a diode. The average power is determined as a voltage by means of an integrator, etc. The gain-variable amplifier 21 is controlled in response to a control signal which is generated by comparison between the determined voltage and a reference voltage, so that the output of the gain-variable amplifier 21 is equal to the reference voltage in amplitude.

When the control signal is generated, the time constant of the integration in the detection and control portion 21c is shortened by a constant period of time.

In the present embodiment, the time constant is shortened by a given period of time in response to a control signal representative of a simplex/multiplex part. As a result, power control can be conducted quickly in the switching portion.

The control signal can use a signal from a multiplexing switching circuit in the transmitter portion, or a upper level layer which controls this circuit. Switching of the time constant can be readily implemented by switching capacitors having different capacitance.

The constant period of time during which the switching is conducted is determined by experiments, etc. in consideration of the period of time which is taken for stabilization due to shortening of the time constant.

Figure 7:
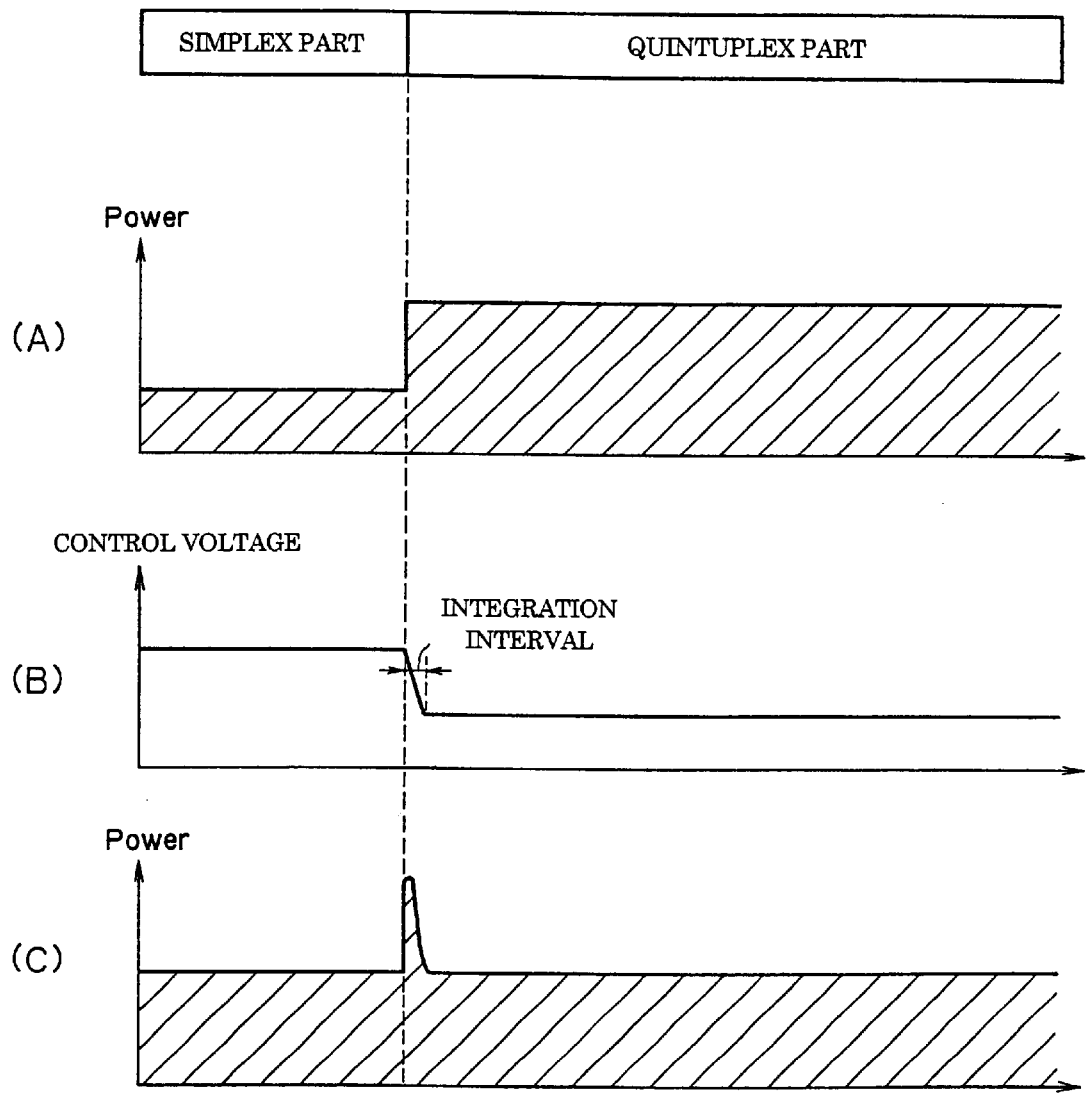
FIG. 7 is a diagram explaining the transmission output control in accordance with a present invention in which input, control voltage and transmission output of the valuable gain amplifier is illustrated.

A result of control at this time is shown in FIG. 7.

The changes in the power on the input side of the gain-variable amplifier 21 are shown in FIG. 7(A). The changes in the voltage of the control signal when the above-mentioned time constant of the integration is decreased (the integration interval is shortened) are shown in FIG. 7(B). The changes in the power of the controlled transmission output are shown in FIG. 7(C).

Figure 5:
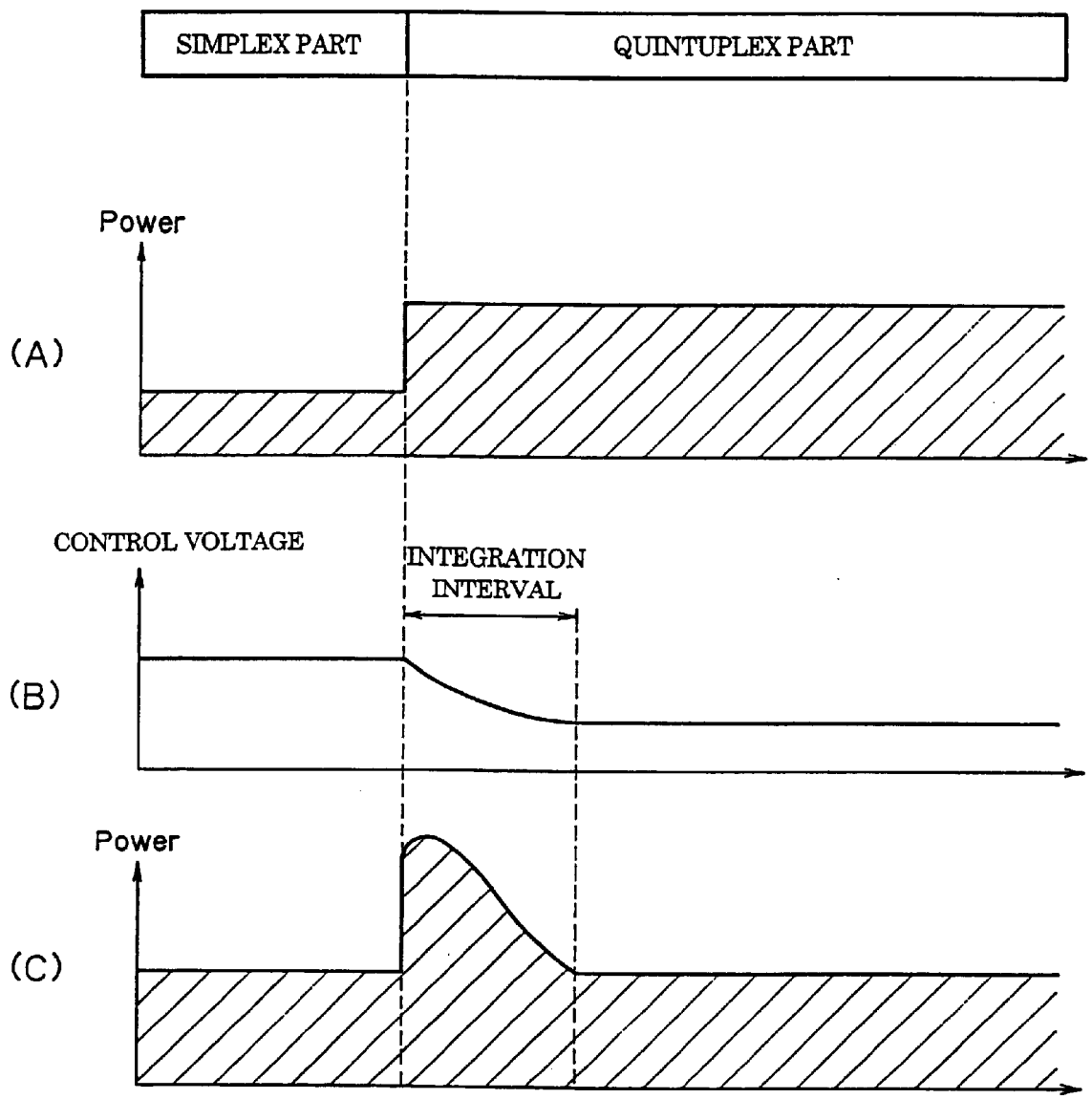
FIG. 5 is a diagram explaining the output characteristics of the transmission output control when transmission is conducted in the prior art shown in FIGS. 3 and 4.

It is found from FIG. 7 that the change in control voltage can be decreased by the decreased time constant of the integration also at the transient so that the output voltage can be quickly stabilized due to the fact that the time constant is decreased (the integration interval is shortened) in comparison to that in the prior art (refer to FIG. 5) after switching of multiplexing mode.

As a result, a problem encountered on switching of multiplexing can be overcome.

An example of switching between simplexing (non-multiplexing) and multiplexing is illustrated herein. This switching between multiplexing and multiplexing (for example, duplexing and quintuplexing) can be similarly performed.

In this case, the time constant is decreased in response to the control signal and the time constant is increased after the lapse of a predetermined period of time. Alternatively, when the period of time for the non-multiplexed signals is short, control may be conducted so that the time constant is decreased from the start of reception and the time constant is switched after the lapse of a predetermined period of time since switching of multiplexing.

In a data format having a simplex part and multiplex part, the length of the simplex part is comparatively shorter. If the time constant is short, the stability is slightly low, so that more or less fluctuations remain. However, the transmission power can be made so constant that only slight deterioration of performance may occur for a short period of time.

As a result, only one operation of the time constant switching is required, so that the control becomes simple. Necessity of counting a predetermined period of time in the control voltage generating portion can be eliminated by providing the control signal after the lapse of the predetermined period of time.

Figure 8:
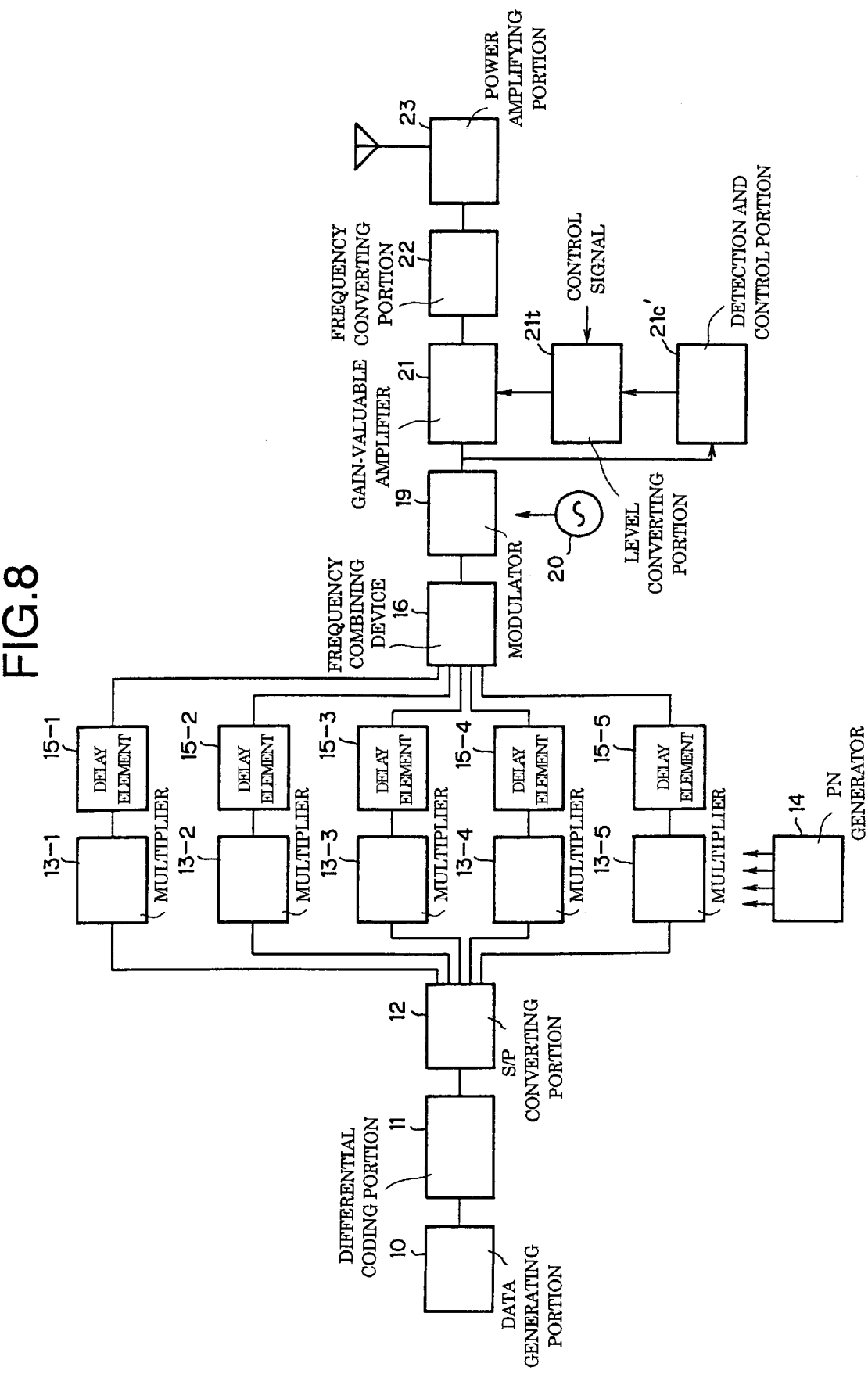
FIG. 8 is a circuit block diagram showing another embodiment of a transmitter for the multi-rated delay multiplexing direct spread spectrum communication system of the present invention.

A transmitter for the multi-rated delay multiplexing direct spread communication system which is a second embodiment of the present invention is shown in FIG. 8.

The transmitter using the gain-variable amplifier 21 at the succeeding stage of the modulator 19 shown in FIG. 8 is substantially identical in structure with above-mentioned embodiment shown in FIG. 6 except that a control signal which is generated based upon the detected signal obtained by inputting the output of the modulator 19 to the detection and control portion 21c' is subjected to level conversion in a level converting portion 21t and is input to the gain-variable amplifier 21 as a control signal.

The present embodiment has a feature that the level of the control signal from the detection and control portion 21c' is converted by inputting the control signal for simplex/multiplex part to the level converting portion 21t.

It has been described that the amplitude level of the simplex part is different from that of the multiplex part. Since the average of the amplitude is a linear sum, the average of the power is 5 times for quintuplexing.

Therefore, the amplitude of the signal after detection is √5.

Hence, the present invention has means for correspondingly converting the level of the control voltage output from the detection and control portion 21c' based upon the preliminarily known multiplicity.

Figure 9:
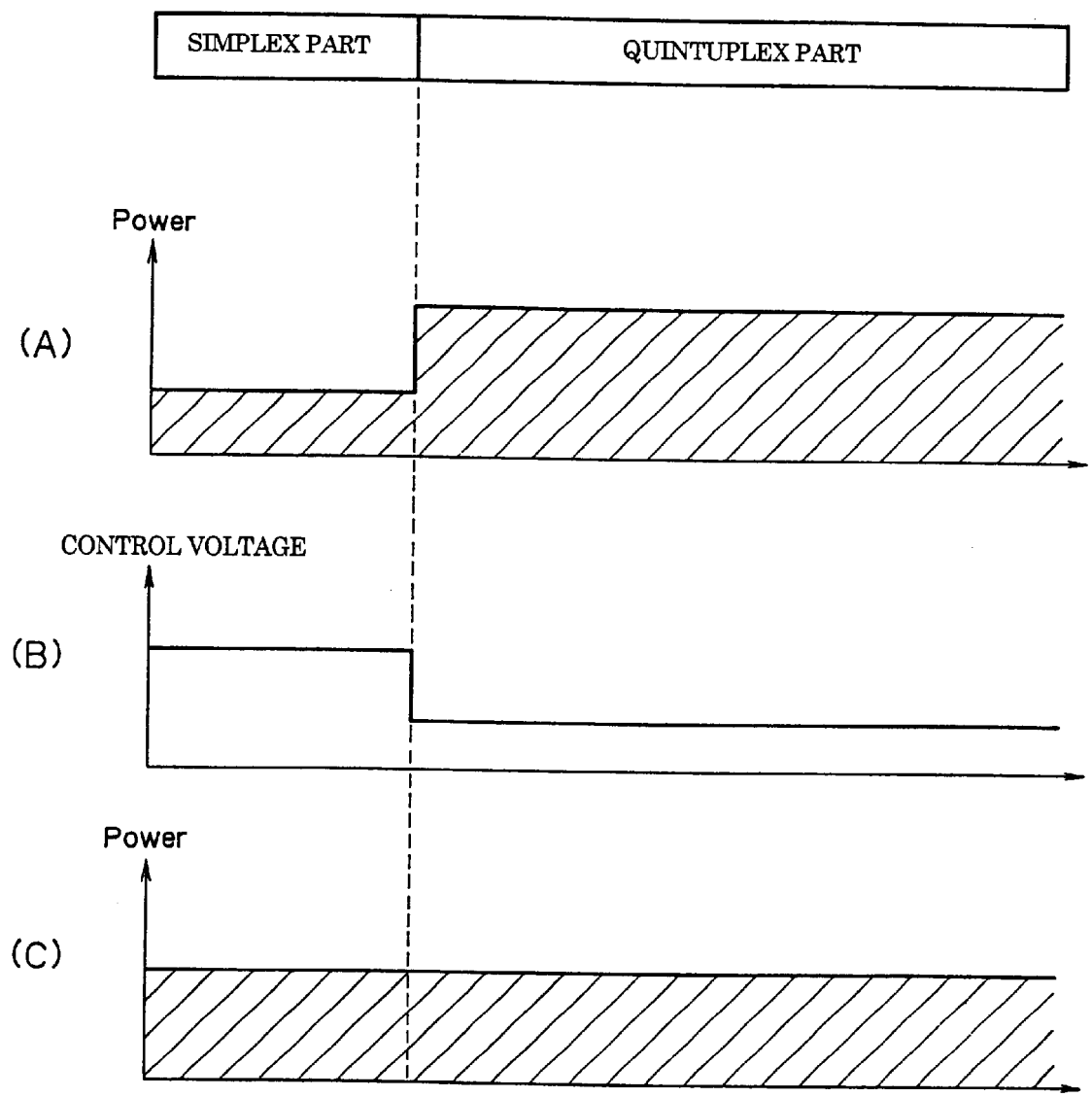
FIG. 9 is a diagram explaining the transmission output control in accordance with a present invention in which input, control voltage and transmission output of the valuable gain amplifier is illustrated.

Specifically, the control voltage is changed by a corresponding amount since the amplitude would be as it is when simplexing $1/(\sqrt{2})$ when duplexing
$1/(\sqrt{3})$ when triplexing
$1/(\sqrt{4})$ when quadruplexing The manner of this control operation is shown in FIGS. 9(A) and 9(C).

FIG. 9(A) shows the changes in power on the input side of the gain-variable amplifier 21. FIG. 9(B) shows the changes in the control voltage and FIG. 9(C) shows the changes in the power of the controlled transmission output.

In this case, a signal before the gain-variable amplifier 21 is used as detection signal. As a result, the detection power from the multiplex part is 5 times (refer to FIG. 9(A)).

Accordingly, the control voltage is lowered by a corresponding amount by using the level converting portion 21t in the present embodiment (refer to FIG. 9(B)). The gain-variable amplifier 21 is of the type in which amplification factor is increased in proportional to the voltage.

As a result, the output voltage after the gain-variable amplifier 21 becomes constant (refer to FIG. 9(C)), so that the problem when multiplicity is switched can be overcome.

Since many of actual circuits do not have any proportional relationship (first order characteristics) between the control voltage and the amplification factor, it is general to conduct the level conversion of the control voltage in accordance with the control voltage and the amplification factor.

Now, a transmitter for the multi-rated delay multiplexing direct spread spectrum communication system that is a third embodiment of the present invention will be described with reference to FIGS. 10 through 13.

In the above-mentioned first and second embodiments, the analog signals which have been modulated are subjected to processing.

However, in some circuits, after spreading, delaying and adding operations are conducted in a digital manner, the signals are D/A converted by a D/A convertor, etc. and input to the modulator.

In the present embodiment, level conversion is conducted for the digital signals prior to D/A conversion.

Figure 4:
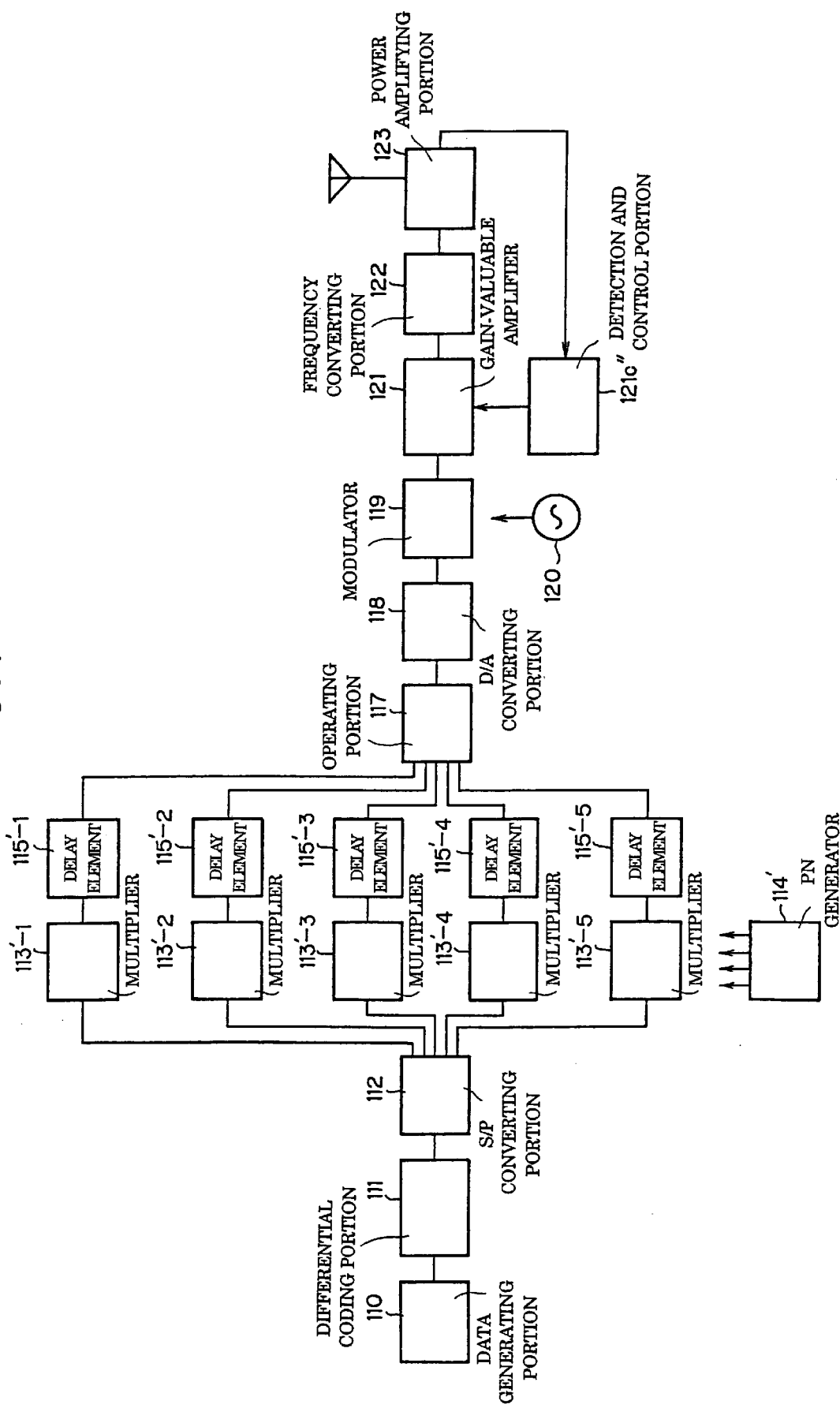
FIG. 4 is a circuit block diagram on the side of a transmitter showing a further direct spread spectrum communication system using a delay multiplexing scheme.

The present embodiment is relevant to the prior art in FIG. 4 excepting the level conversion.

Figure 10:
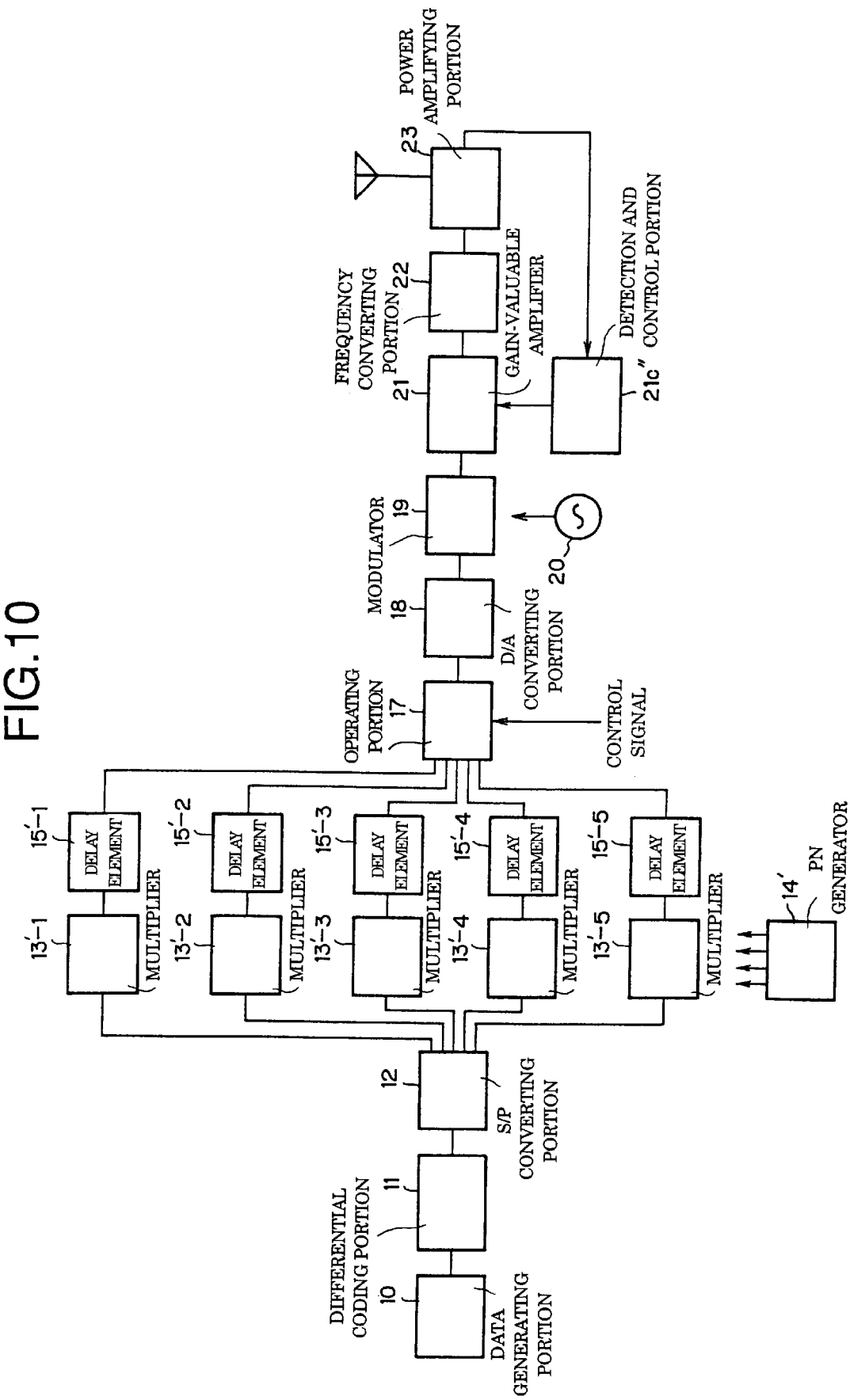
FIG. 10 is a circuit block diagram showing a further embodiment of a transmitter for the multi-rated delay multiplexing direct spread spectrum communication system of the present invention.

Level conversion in the form of digital signals is conducted in an operating portion 17 prior to the D/A converting portion 18 in FIG. 10. At this end, a control signal depending upon the multiplicity is input from an external portion to the operating portion 17.

Figure 11:
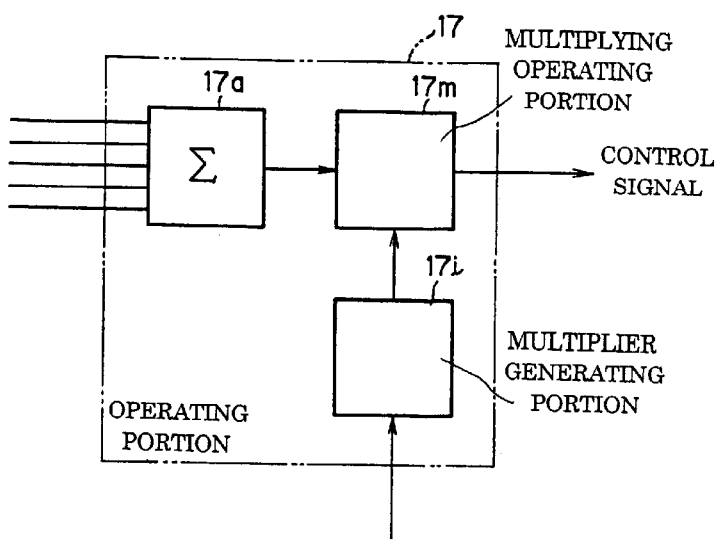
FIG. 11 is a circuit diagram showing an operation portion in the embodiment of FIG. 10 in more detail.

The circuit configuration of the operating portion 17 is shown in detail in FIG. 11.

The operating portion 17 comprises an adder 17a for adding for multiplexing the delayed spread signals, a multiplying operating portion 17m for conducting the level conversion and a multiplier generating portion 17i, which receives a control signal having simple/multiplex part for generating a multiplier which is used for the level conversion.

Figure 12:
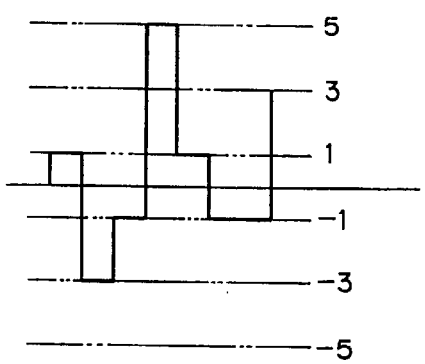
FIG. 12 is a wave form chart explaining the operation function in the operating portion of FIG. 11.
Figure 13:
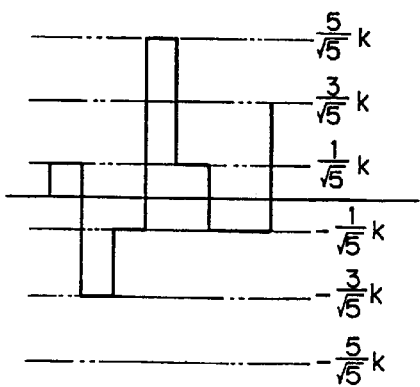
FIG. 13 is a wave form chart explaining the operation function in the operating portion of FIG. 11.

FIGS. 12 and 13 are wave form charts explaining the operating function, showing the wave forms prior to and after the operation of the multiplying operating portion 17m when quintuplexing is conducted, respectively.

The signals assume six values such as 5, 3, 1, −1, −3, −5 before the multiplying operating portion 17m and assumes six values such as $(5/\sqrt{5})k$, $(3/\sqrt{5})k$, $(1/\sqrt{5})k$, $(-1/\sqrt{5})k$, $(-3/\sqrt{5})k$, $(-5/\sqrt{5})$, after the multiplying operating portion 17m. As a result, the amplitude level conversion is thus conducted.

At this time, the value of the simplexed part assumes k, −k.

As a result, the average power of the simplex part is equal to that of the multiplex part.

k is preset in such a manner that the quantization error of the signal which is given to D/A convertor becomes less.

If the output after addition is multiplied by $5/\sqrt{5}$ without using a proportional multiplier, the six values assume 2.236, 1.342, 0.447, −0.447, −1.342, −2.236. The values assume 2, 1, 0, 0, −1, 2 if the result of operation is operated by counting fractions of 5 and over as a portion and disregarding the rest since the analog value corresponds to a discrete value of an integer in case of D/A conversion. The error on quantization would be come larger, so that equal 6 levels would not occur.

Accordingly, if k is selected about 100, the resolution would become higher, so that the quantization error could be 1/100. This k is selected depending upon the number of quantization bits of the D/A convertor. For example, k differs whether the convertor is 8 or 10 bit D/A convertor.

In such a manner, the transmission output can be constant by subjecting the operation result of the digital portion to an operation. Since the transmission output is not influenced by the time constant of the integrator, etc. by conducting the level conversion in the digital portion as is done in the former embodiment, level conversion can be conducted on a real time basis in response to a control signal, so that the output error at transient can be less.

A transmitter for the multi-rated delay multiplexing direct spread spectrum communication system which is a fourth embodiment of the present embodiment will be described.

The quantization error of the D/A convertor is made less by selecting k in the above-mentioned embodiment. However, a slight quantization error remains.

The residual error can be absorbed by combining the level control of the transmission output in the third embodiment with that in first and second embodiments.

Figure 14:
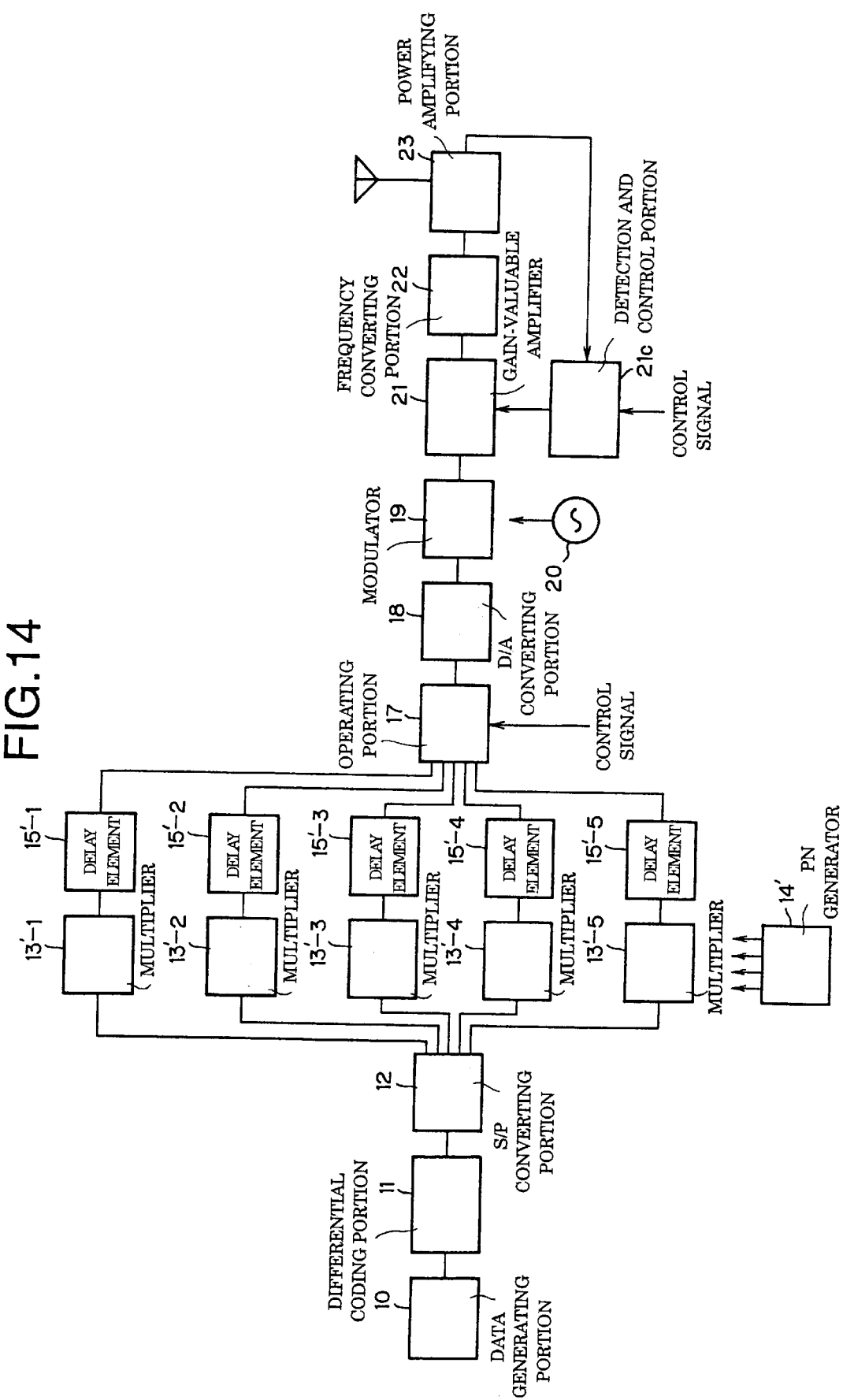
FIG. 14 is a circuit block diagram showing a transmitter in which the detection and control portion of the transmitter shown in FIG. 10 is operated in response to a control signal of the simplex/multiplex part.
Figure 15:
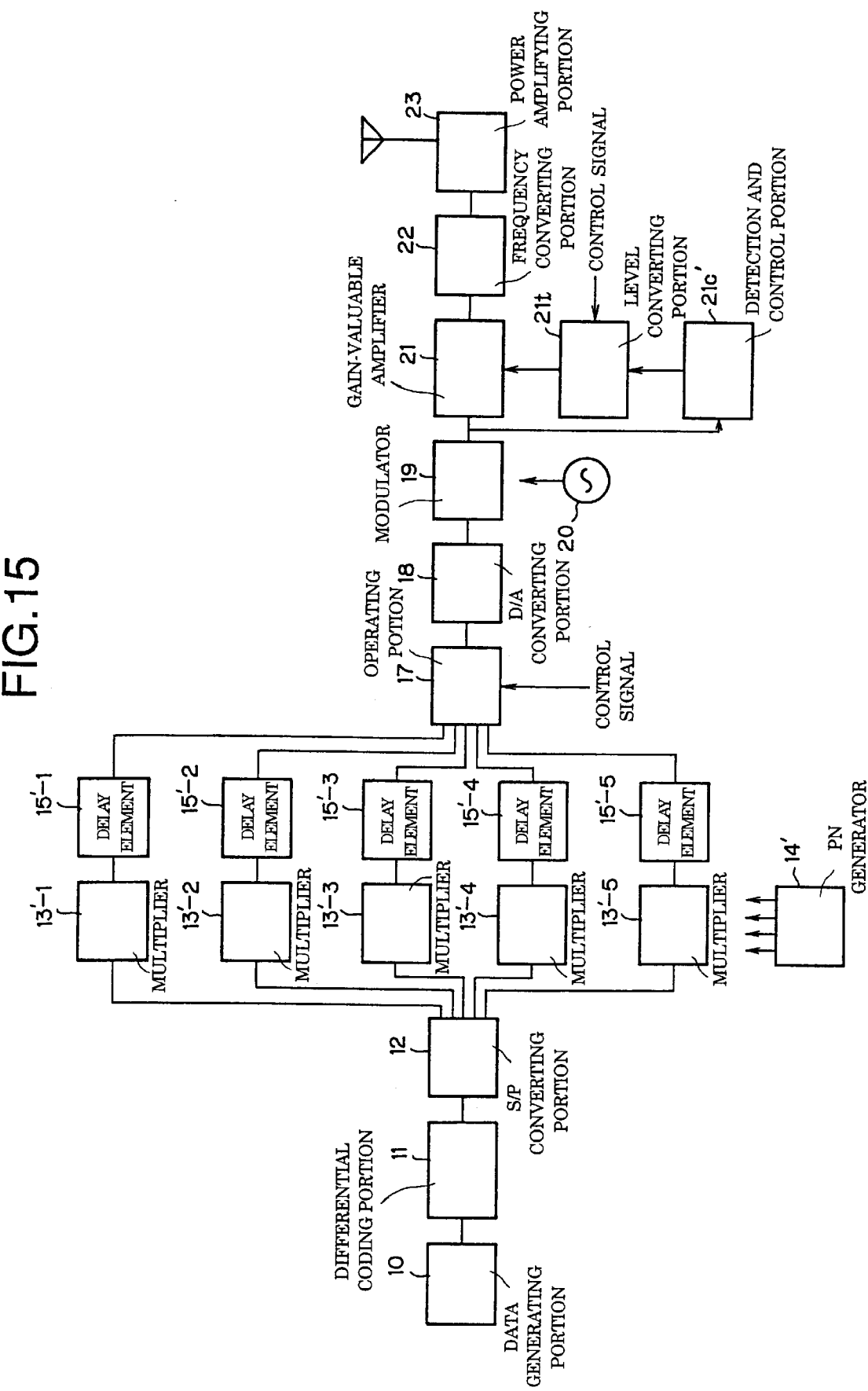
FIG. 15 is a circuit block diagram showing a transmitter in which the detection and control portion of the transmitter shown in FIG. 10 is operated by the detection and control portion and the level converting portion 21t shown in FIG. 8.

More detailed configuration of the present embodiment is illustrated in FIGS. 14 and 15.

The transmitter (transmitting device) shown in FIG. 14 is arranged in such a manner that the detection and control portion in the transmitter shown in FIG. 10 is operated in response to a control signal for the simplex/multiplex part (this operation is identical with that of the detection and control portion 21c in FIG. 6).

The transmitter of FIG. 15 is arranged in such a manner that its detection and control portion is operated by means of the detection and control portion 21c' and the level converting portion 21d shown in FIG. 8. In other words, the frequency combiner in FIGS. 6 and 8 is replaced with an operating portion, which is controlled in response to a control signal.

In such a manner, the residual quantization error can be absorbed by the effects of the first and second embodiments. This is effective in particular when the number of bits of the D/A convertor is small.

Figure 16:
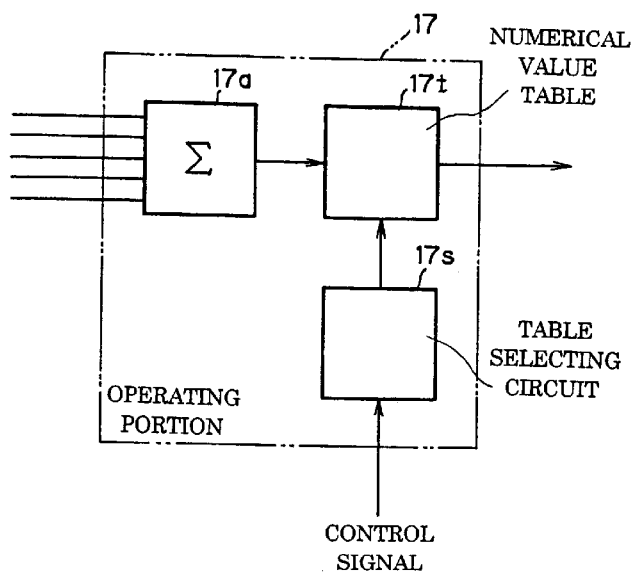
FIG. 16 is a circuit block diagram showing a further embodiment of a transmitter for the multi-rated delay multiplexing direct spread spectrum communication system of the present invention.

A transmitter for the multi-rated delay multiplexing direct spread spectrum communication system which is a fifth embodiment of the present invention is shown in FIG. 16. Only an operation portion is shown in FIG. 16. The operating portion is used as the operating portion in the third embodiment (refer to FIGS. 10 and 11) and in the fourth embodiment (refer to FIGS. 14 and 15).

The operating portion 17 which is shown in FIG. 16 comprises an adder 17a for adding delayed signals, a table selecting circuit 17s for selecting a table which will be used among the numeral value tables in response to a selecting signal and numeral value tables 17t. In the third embodiment (refer to FIG. 10), a multiplier is selected for each multiplying operation.

However, the multiplier can be eliminated by preliminarily determining the values after multiplying and stored them in the numeral value table 17t since the multiplicity is several at most.

The multiplier has generally a large circuit, and a large number of operating bits is necessary to conduct operations relating with $\sqrt{}$ and a long period of time for the operation is taken.

In the operating portion 17, the table selecting circuit 17s is operated in response to a control signal to generate a select signal for determining the table of the multiplicity in the table 17t to be selected. The numeral number table 17t is accessed depending upon the added value of the adder 17a for obtaining its output.

The circuit can be made smaller by preliminarily providing a numeral value table which operates in such a manner. Only selection from a table is required so that the speed will become higher.

An example will be shown as follows.

If an 8 bit D/A convertor is used for multiplexing Barker code of 11 chips, the numeral values could be −38, 38 when simplexing −54, 0, 54 when duplexing −66, −22, 22, 66 when triplexing −76, −38, 0, 38, 76 when quadruplexing −85, −51, −17, 17, 51, 85 when quintuplexing The average amplitude error at this time is 1.0000 when simplexing 1.0097 when duplexing 1.0055 when triplexing 1.0000 when quadruplexing 1.0007 when quituplexing It is found that the error is suppressed sufficiently low.

A receiver for the multi-rated delay multiplexing direct spread spectrum communication system, which is a sixth embodiment of the present invention, will be described.

In a system in which the transmission output is kept constant by the above-mentioned invention or a method which is also described in the prior art, the problem is reduced by a method of making the reception output constant by a gain-variable amplifier on the receiver side. Since the spectrum spread signal generally has a low C/N which may be sometime negative. AGC may not be normally operated for the signals which have not been correlated.

Accordingly, the problem is solved by arranging the system in such a manner that the level of the received signal is kept constant in response to the received correlation output in accordance with the present invention when AGC is performed.

Figure 17:
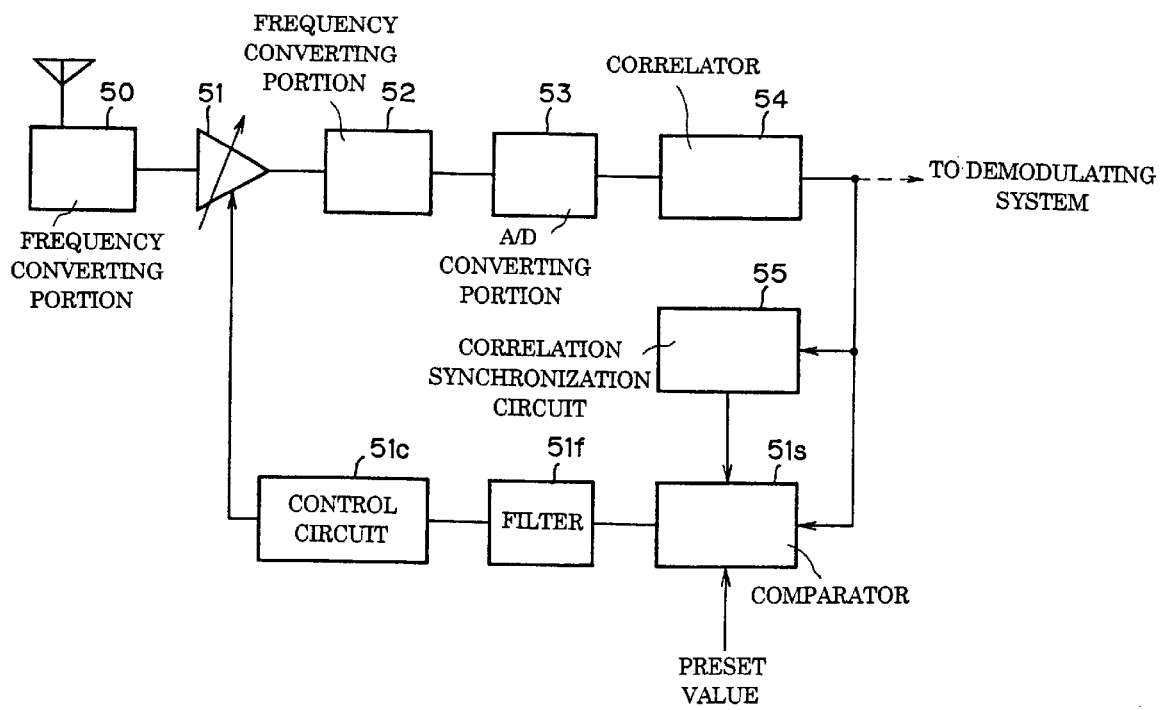
FIG. 17 is a circuit block diagram showing a prior art receiver for the delay multiplexing direct spread spectrum communication system.

An embodiment of the present invention having such a configuration is shown in FIG. 17.

A signal which is received by an antenna is converted into an IF signal by a frequency converting portion 50. A gain controlled amplifier 51 which amplifies the converted IF signal is provided so that the amplification can be controlled. The other amplifiers and filters are shown as being omitted in FIG. 17.

After amplifying, the frequency of the signal is converted to provide a base band signal by a frequency converting portion 52 and then digitalized by an A/D converting portion 53. Correlation between the signals is determined by a correlator 54.

The output of the correlator 54 is used for demodulation and is simultaneously input to a correlation synchronization circuit 55 for extracting the correlation timing.

On the other hand, in order to control the gain controlled amplifier 51, a comparator 51s into which the output of the correlator is input is used. A control signal for the gain controlled amplifier 51 is generated by passing the output of the comparator 51s through a filter 51f and a control circuit 51c. That is, comparison between the signal and a preset value is conducted by the comparator 51s in correlation spike timing at correlation synchronization timing in a correlation synchronization circuit 55 for controling the gain controlled amplifier 51 by using a value depending upon a comparison result as a control signal so that the correlation output is constant in such a system.

Since the control signal is generated by feed-backing the correlation output, the correlation output after controlling is proportional to the received signal component. Since control can be conducted at a higher C/N than that when control is conducted by detecting the spread signal, the control precision can be enhanced.

However, if the transmission power is constant in a configuration having both simplex and multiplex parts, the correlation output for the multiplex part would be lowered than that for the simplex part when the signal is received without any conversion.

Figure 18:
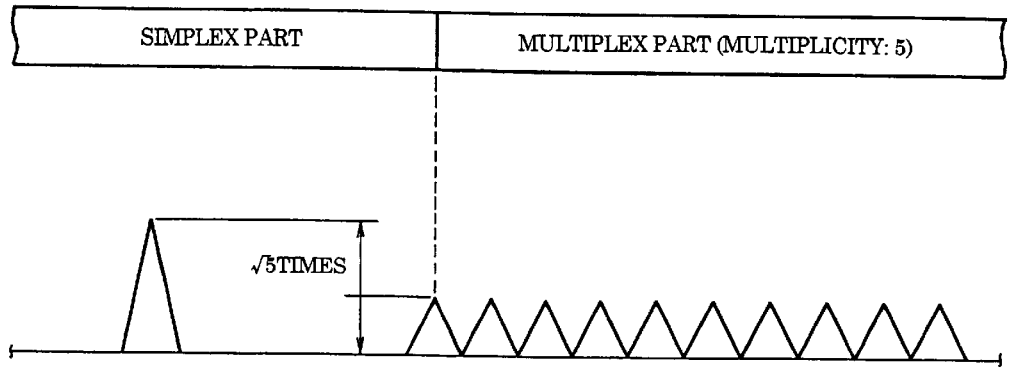
FIG. 18 is a diagram showing the correlation output which is obtained by the reception of simplexed/multiplexed signals by the receiver of FIG. 17 when the multiplicity is, for example, 5.

In order to explain this, an example of the correlation output when simplexing and quintuplexing is modeled and shown in FIG. 18. The amplitude of the correlation output in the quintuplexed part has only $(1/\sqrt{5})$ in comparison with that in the simplexed part.

If gain control is conducted based upon a value which is obtained in such a manner, a disadvantage is encountered in that the reception gain is increased $\sqrt{5}$ times at multiplex part.

Figure 19:
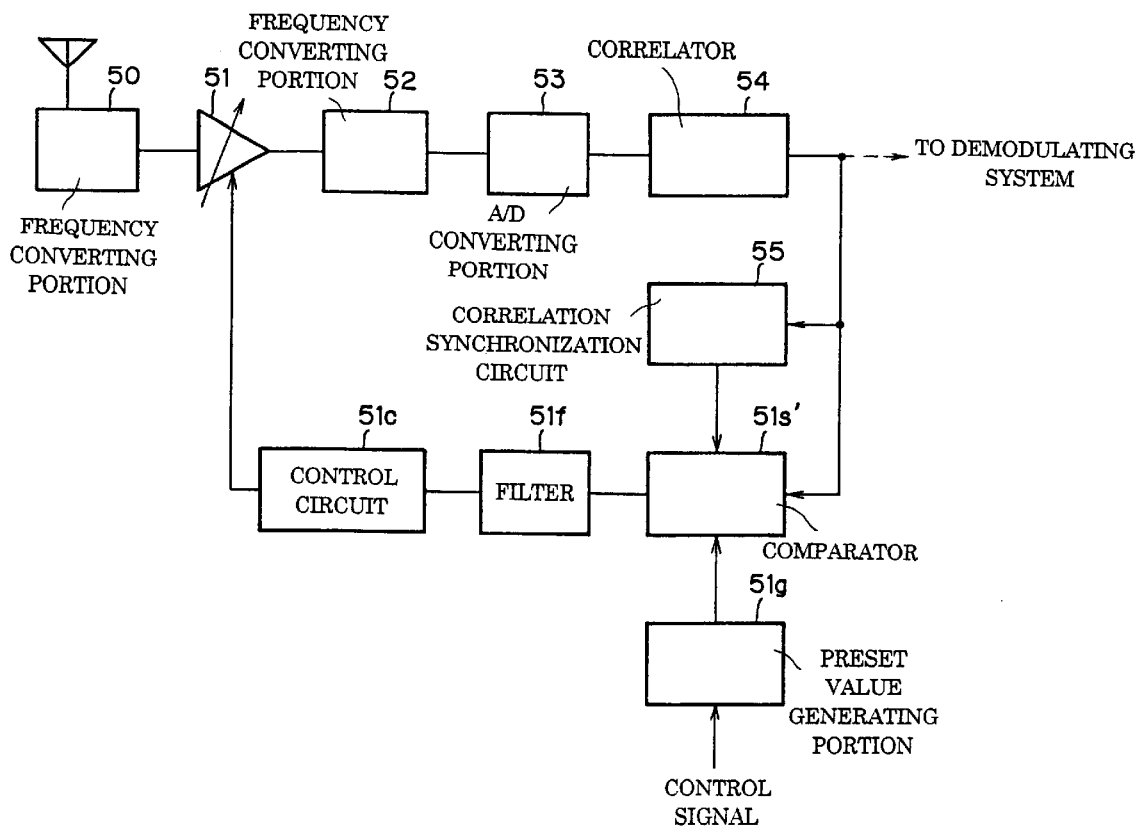
FIG. 19 is a circuit block diagram showing a receiver for the multi-rated delay multiplexing direct spread spectrum communication system which is a further embodiment of the present invention.

A seventh embodiment of the present invention for overcoming this problem is shown in FIG. 19. The embodiment show in FIG. 19 is substantially identical with that shown in FIG. 17 excepting that a preset value generating portion 51g in which the preset value is changed in response to a control signal is added.

The present embodiment has a feature that the presetting of the preset value generating portion 51g is changed in response to a control signal representative of the multiplicity for switching the preset value given to the comparator 51s' independently of the multiplex part.

Herein, the preset value is switched to 1, $\sqrt{2}$, $\sqrt{3}$, $\sqrt{4}$, $\sqrt{5}$, etc. depending upon the multiplicity.

As a result, received power can be kept uniform even after switching of multiplexing.

The timing of generating this control signal may be changed by determining the switching timing in response to a signal which is demodulated on reception or depending upon the preliminarily determined data length.

Since the actual optimum reception amplitude on multiplexing may vary slightly, the preset value may be slightly changed depending upon data of experiments or simulations.

In accordance with the present embodiment, the demodulation power on reception can be kept constant even if multiplicity is switched.

Figure 20:
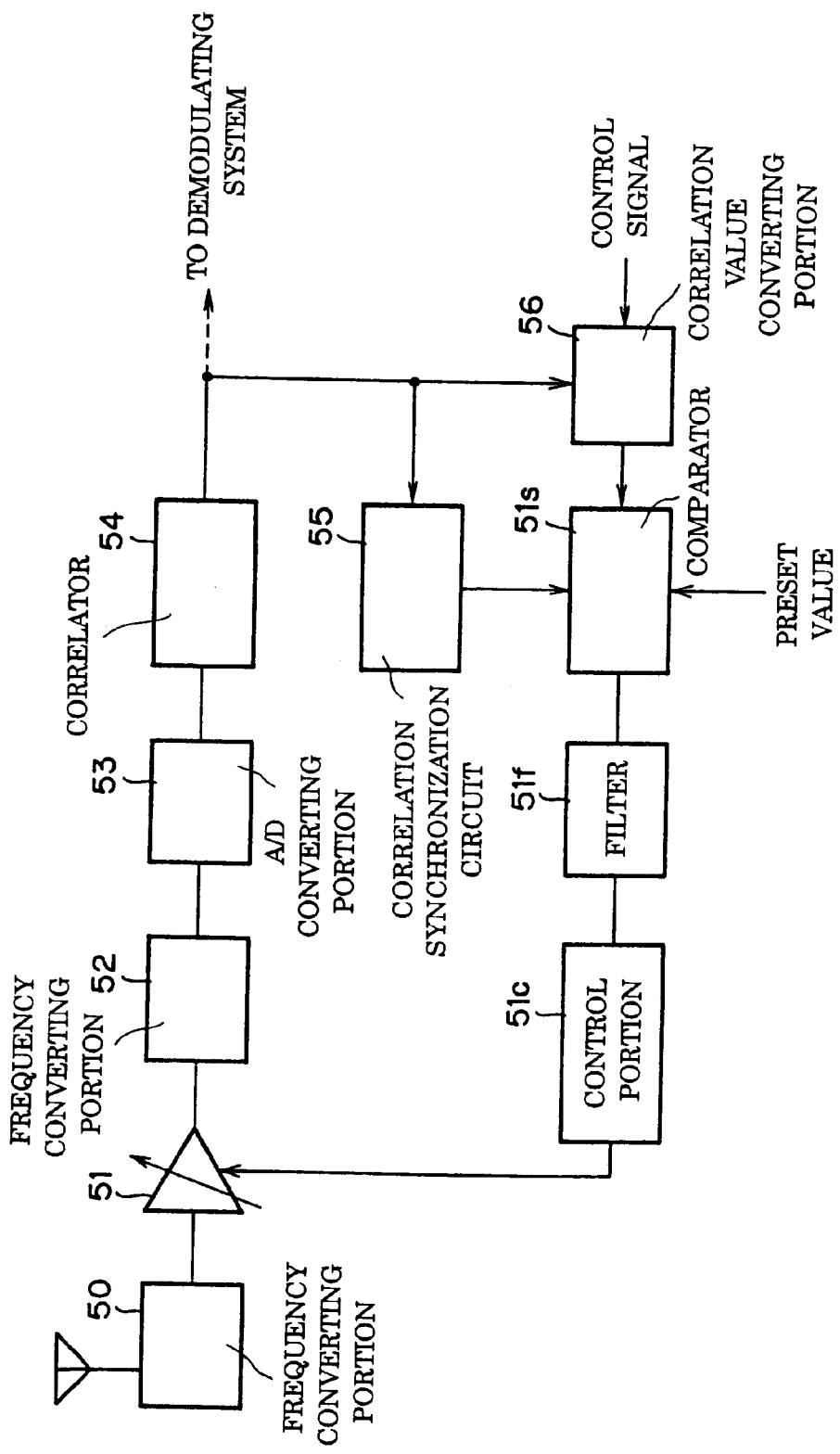
FIG. 20 is a circuit block diagram showing a receiver for the multi-rated delay multiplexing direct spread spectrum communication system which is a further embodiment of the present invention.

An eighth embodiment in which the gain adjustment on the receiver side is performed by an alternative method is shown in FIG. 20. The embodiment shown in FIG. 20 is substantially identical with that in FIG. 17 except that a correlation value converting portion 56 which is controlled by a control signal is added to the embodiment shown in FIG. 17 so that the output of the correlation value converting portion 56 is the correlation input value to the comparator 51s.

In contrast to the seventh embodiment in which the preset value is switchable, the correlation output can be changed. At this end, the correlation value converting portion 56 is provided.

In FIG. 20, the received power can be kept constant even after the switching of multiplexing by operating the correlation value converting portion 56 in response to a control signal for converting the output correlation signal which will be input to the comparator 51s.

The timing at which this control signal is generated can be similarly obtained.

Since the actual optimum received signal amplitude may also vary slightly in this case, the preset value may adjusted slightly based upon data of experiments and simulations.

In order to perform the conversion, (1) subtraction of the correlation output and (2) use of conversion table is conceivable.

Also in this case, demodulated signal power on reception can be kept constant even if multiplexing is switched.

As mentioned above, in case in which the transmission signal relying on a delay multiplexing scheme which may be multi-rated is in a format having a non-multiplex (simplex) part and multiplex part which is multiplexed in this scheme, standard of Japanese Radio Law can be satisfied and load imposed upon the power amplifier can be mitigated by controlling the transmission power so that it is made constant for the simplex/multiplex part of the transmission signal.

If means for detecting the power of the transmission output to control the amplifier output so that the transmission power is constant, the fluctuation in output at the transient can be suppressed small by reducing the time constant of the integration in the detecting means at the transient on switching of the multiplicity. The disadvantage that the transmission output which is generated at the transient on switching of the multiplicity can be reduced. Reduction in the time constant from the beginning of the simplex part can eliminate the control of the time constant on switching the multiplex part following the simplex part.

The fluctuation in output at the transient can be more quickly suppressed to a small range by changing the level of the control voltage for controlling the gain of the amplifier depending upon the switching of the multiplicity.

In a system configuration in which multiplexing is performed by a digital operation, the operated digital value is D/A converted, and transmission is performed in response to the D/A converted output, the transmission power can be made constant without changing the analog system by the square root of the average amplitude of non-multiplexed value and multiplexed value, or for each number of the multiplicity. Processing is easy and the influence at the transient is eliminated.

Combination with analog circuits, the influence of the quantization error which is residual even by controlling using the digital values which are discrete can be reduced.

Operations such as multiplying operation can be eliminated by storing numerical values given to D/A convertors which are provided for each multiplicity in a numerical table. This leads to simplification of the circuit. A numerical value which is suitable for use of Barker code of 11 chips and 8 bit D/A convertor is presented, so that effectively embodied means are provided.

In a case in which the gain adjustment on reception is performed by using the correlation output on the side of a receiver which receives the transmission signal which is transmitted at a constant transmission power in a multi-rated delay multiplexing scheme, an amplitude control method using the correlation output can be used for communications signal having a format of simplex/multiplex part by presetting a comparison value which is referenced to a value depending upon the power ratio by a multiplexing switching part or alternatively by operating a value given to AGC into a value depending upon the power ratio from the multiplexing switching portion.

A communication system which utilizes the advantages of the transmitter and receiver of the present invention is provided.

What is claimed is:

1. A transmitter for a multi-rated delay multiplexing direct spread spectrum communication system comprising:
    delay multiplexing means for multiplexing a series of signals obtained by delaying by a desired number of chips wherein each of said signals being directly spread with a same spreading code; and
    transmission processing means for generating transmission signals by modulating the transmission signals which have been multiplexed by said delay multiplexing means and by converting a band of them, in which multi-rated transmission signals are generated in a format having a simplex part and a multiplex part having a given multiplicity; and
    a control means for controlling the transmission power so that it is constant, and
    in that said control means performs a control operation depending upon the multiplicity of said format.

2. The transmitter for a multi-rated delay multiplexing direct spread spectrum communication system as defined in claim 1, wherein said control means changes its control operation to make the transmission power constant for each multiplicity in response to a signal representative of the multiplicity which is determined by said format when the multiplexing operation is switched in response to the multiplicity representing signal.

3. The transmitter for a multi-rated delay multiplexing direct spread spectrum communication system as defined in claim 1 or 2, further comprises:
    detecting means for detecting the transmission power output in said transmission processing means; and
    means for controlling an amplified output of said transmission processing means in response to a detection output of said detecting means as said control means; and wherein
    a time constant of an integration of said detecting means being reduced in response to a multiplexing switching signal which is defined by said format at a period of transition at which multiplexing is switched.

4. The transmitter for a multi-rated delay multiplexing direct spread spectrum communication system as defined in claim 1, further comprises:
    detecting means for detecting the transmission power output in said transmission processing means; and
    means for controlling an amplified output of said transmission processing means in response to a detection output of said detecting means as said control means; and wherein
    a time constant of an integration of said detecting means being reduced in response to a signal representing a simplex part and a multiplexing switching signal which are defined by said format at a period of transition at which multiplexing is switched.

5. The transmitter for a multi-rated delay multiplexing direct spread spectrum communication system as defined in any one of claim 1, 2 or 4 to, further comprises:
    detecting means for detecting the transmission power output in said transmission processing means;
    said control means for controlling the amplified output of said transmission processing means in response to a detection output of said detecting means; and
    means for converting an amplitude of a control signal from said control means in response to a multiplexing signal which is defined by said format.

6. The transmitter for a multi-rated delay multiplexing direct spread spectrum communication system as defined in any one of claim 1, 2 or 4, wherein if a digital operation is performed in said delay multiplexing means, changing of a multiplier for data to be multiplexed in said digital operation depending upon a signal representative of the multiplicity which is determined by said format is performed as one of said control means, so that an average amplitude is constant in square root among multiplicity including simplex.

7. The transmitter for a multi-rated delay multiplexing direct spread spectrum communication system as defined in any one of claim 1, 2 or 4, wherein if a digital operation is performed in said delay multiplexing means, a numerical value table which is referenced by the multiplexing data of a result of said digital operation is used as one of said control means; and
    in that data is output which makes the transmission power constant by changing said numerical value table in response to a signal representative of the multiplicity which is determined by said format.

8. The transmitter for a multi-rated delay multiplexing direct spread spectrum communication system as defined in claim 7, wherein for each multiplicity, there are provided said numerical value tables having numerical values which make a converted transmission power constant even if the numerical values which are given to a Digital/Analog (D/A) convertor for D/A data conversion after referencing to said numerical value tables are discrete, and
    in that one of said numerical value tables is selected depending upon a signal representative of the multiplicity which is determined by said format.

9. The transmitter for a multi-rated delay multiplexing direct spread spectrum communication system as defined in claim 8, wherein if a Barker code of 11 chips is multiplexed and a 8 bit D/A convertor is used, the numerical values which are provided in each of said numerical value tables are
    −38, 38 when simplexing
    −54, 0, 54 when duplexing
    −66, −22, 22, 66 when triplexing
    −76, −38, 0, 38, 76 when quadruplexing
    −85, −51, −17, 17, 51, 85 for quintuplexing.

10. A receiver for multi-rated delay multiplexing direct spread spectrum communication system comprising:
    receiving and processing means for receiving signals which are transmitted at an equal transmission output irrespective of multiplicity by multi-rating signals which are a spreading-code-spreaded, in a format having a multiplex part in which a plurality of series of signals each being delayed by a desired number of chips and a simplex part, and
    in which gain adjustment in said receiving and processing means on reception is conducted depending upon a correlation output value,
    wherein a reference comparison value which is compared with said correlation output value for generating a control signal of the gain adjustment is preset to a comparison value depending upon a power ratio of said multiplicity by a multiplexing switching part based upon said format.

11. A receiver for multi-rated delay multiplexing direct spread spectrum communication system comprising:

receiving and processing means for receiving signals which are transmitted at an equal transmission output irrespective of multiplicity by multi-rating signals which are a spreading-code-spreaded, in a format having a multiplex part in which a plurality of series of signals each being delayed by a desired number of chips and a simplex part, and in which the gain adjustment in said receiving and processing means on reception is conducted depending upon a correlation output value, wherein said correlation output value which is compared with a reference comparison value being used for generating a control signal for the gain adjustment, a correlation output value is used wherein the correlation output value is obtained by converting a correlation signal received depending upon a power ratio of its multiplicity by a multiplexing switching part based upon said format.

12. A multi-rated delay multiplexing direct spread spectrum communication system comprising:

a transmitter for multi-rated delay multiplexing direct spread spectrum communication including delay multiplexing means for multiplexing a series of signals obtained by delaying by a desired number of chips wherein each of said signals being directly spread with a same spreading code; transmission processing means for generating transmission signals by modulating the transmission signals which have been multiplexed by said delay multiplexing means and by converting a band of them, in which multi-rated transmission signals are generated in a format having a simplex part and a multiplex part having a given multiplicity; and a control means for controlling the transmission power so that it is constant, and in that said control means performs a control operation depending upon the multiplicity of said format; and a receiver for multi-rated delay multiplexing direct spread spectrum communication including receiving and processing means for receiving signals which are transmitted at an equal transmission output irrespective of multiplicity by multi-rating signals which are a spreading-code-spreaded, in a format having a multiplex part in which a plurality of series of signals each being delayed by a desired number of chips and a simplex part, and in which gain adjustment in said receiving and processing means on reception is conducted depending upon a correlation output value, wherein a reference comparison value which is compared with said correlation output value for generating a control signal of the gain adjustment is preset to a comparison value depending upon a power ratio of said multiplicity by a multiplexing switching part based upon said format.

13. A multi-rated delay multiplexing direct spread spectrum communication system comprising:

a transmitter for a multi-rated delay multiplexing direct spread spectrum communication including delay multiplexing means for multiplexing a series of signals obtained by delaying by a desired number of chips wherein each of said signals being directly spread with a same spreading code; transmission processing means for generating transmission signals by modulating the transmission signals which have been multiplexed by said delay multiplexing means and by converting a band of them, in which multi-rated transmission signals are generated in a format having a simplex part and a multiplex part having a given multiplicity; and a control means for controlling the transmission power so that it is constant, and in that said control means performs a control operation depending upon the multiplicity of said format; and a receiver for multi-rated delay multiplexing direct spread spectrum communication including receiving and processing means for receiving signals which are transmitted at an equal transmission output irrespective of multiplicity by multi-rating signals which are a spreading-code-spreaded, in a format having a multiplex part in which a plurality of series of signals each being delayed by a desired number of chips and a simplex part, and in which the gain adjustment in said receiving and processing means on reception is conducted depending upon a correlation output value, wherein said correlation output value which is compared with a reference comparison value being used for generating a control signal for the gain adjustment, a correlation output value is used wherein the correlation output value is obtained by converting a correlation signal received depending upon a power ratio of its multiplicity by a multiplexing switching part based upon said format.

\* \* \* \* \*